(12) United States Patent
Saunders

(10) Patent No.: US 11,892,858 B2
(45) Date of Patent: Feb. 6, 2024

(54) SYSTEMS AND METHODS FOR OPERATING A VEHICLE IN A DEGRADED VISUAL ENVIRONMENT

(71) Applicant: Aurora Flight Sciences Corporation, Manassas, VA (US)

(72) Inventor: Jeffery Saunders, Quincy, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 84 days.

(21) Appl. No.: 17/394,772

(22) Filed: Aug. 5, 2021

(65) Prior Publication Data

US 2022/0113742 A1   Apr. 14, 2022

Related U.S. Application Data

(60) Provisional application No. 63/091,218, filed on Oct. 13, 2020.

(51) Int. Cl.
| | | |
|---|---|---|
| G05D 1/10 | (2006.01) | |
| B64D 45/04 | (2006.01) | |
| B64D 47/08 | (2006.01) | |
| G01S 7/497 | (2006.01) | |

(52) U.S. Cl.
CPC .............. G05D 1/101 (2013.01); B64D 45/04 (2013.01); B64D 47/08 (2013.01); G01S 7/497 (2013.01)

(58) Field of Classification Search
CPC ........ G05D 1/101; B64D 45/04; B64D 47/08; G01S 7/497
See application file for complete search history.

(56) References Cited

U.S. PATENT DOCUMENTS

| 8,711,220 B2* | 4/2014 | Tiana ....................... H04N 7/18 348/148 |
| 2014/0081573 A1* | 3/2014 | Urmson .................. G01S 17/42 356/600 |
| 2014/0324266 A1* | 10/2014 | Zhu ........................ G01S 13/865 382/104 |
| 2017/0001732 A1* | 1/2017 | Lim ..................... G05D 1/0684 |

(Continued)

OTHER PUBLICATIONS

Zimmermann et al, "First results of Lidar-aided helicopter approaches during NATO DVE mitigation trials", Jan. 2019, CEAS Aeronautical Journal, whole document (Year: 2019).*

(Continued)

*Primary Examiner* — Navid Z. Mehdizadeh
*Assistant Examiner* — Kenneth M Dunne
(74) *Attorney, Agent, or Firm* — McDonnell Boehnen Hulbert & Berghoff LLP

(57) ABSTRACT

An example method includes identifying a degraded visual environment corresponding to a phase of a route followed by the vehicle. The method includes determining, based on the phase of the route, a first segment of a trajectory of the vehicle along which to search for a location with an improved navigation environment. The method includes causing the vehicle to follow the first segment until: (i) identifying the improved navigation environment, or (ii) reaching an end of the first segment without identifying the improved navigation environment. The method includes determining a second segment of the trajectory based on whether the improved navigation environment has been identified. The method includes causing the vehicle to follow the second segment.

20 Claims, 14 Drawing Sheets

(56) References Cited

U.S. PATENT DOCUMENTS

2018/0100928 A1* 4/2018 Keilaf .................. G01S 17/931
2018/0351634 A1* 12/2018 Ryan ...................... H04N 7/185
2020/0286391 A1 9/2020 Beaurepaire et al.

OTHER PUBLICATIONS

Stelmash et al, "Flight Test results of ladar brownout look-through capabilities", Jun. 2015, SPIE. Whole document (Year: 2015).*
Wikipedia Article "Brownout (aeronautics)", 2018, Wikipedia (Year: 2018).*
FAA, "Helicopter Flying Handbook Chapter 10: "Advanced Flight Maneuvers"", 2019, FAA, whole document (Year: 2019).*
Niklas Peinecke, "Detection of Helicopter landing sites in unprepared terrain", 2014, SPIE (Year: 2014).*
Zimmermann et al., "First results of LIDAR-aided helicopter approaches during NATO DVE-mitigation trials", CEAS Aeronautical Journal, vol. 10, No. 3, Jan. 2, 2019, pp. 859-874.
Zimmermann et al., "Flight test results of helicopter approaches with trajectory guidance based on in-flight acquired LIDAR data", Proceedings of SPIE, vol. 9839, May 13, 2016, pp. 983902-2-983902-18.
Extended European Search Report prepared by the European Patent Office in application No. EP 21 19 2095.4 dated Feb. 18, 2022.

* cited by examiner

SYSTEMS AND METHODS FOR OPERATING A VEHICLE IN A DEGRADED VISUAL ENVIRONMENT

CROSS REFERENCE TO RELATED APPLICATION

The present application is a non-provisional patent application claiming priority to U.S. Provisional Application No. 63/091,218, filed on Oct. 13, 2020, the contents of which are hereby incorporated by reference.

FIELD

The present disclosure relates generally to operation of a vehicle, and more particularly, to systems and method for operating a vehicle in a degraded visual environment.

BACKGROUND

A vehicle, such as an aircraft, may operate to travel along a predetermined route. Some contexts of operating the vehicle may rely at least in part on visual information. For example, a takeoff or landing phase of a route for an aircraft may use visual information to navigate the aircraft. A degraded visual environment may impair such navigation In the context of autonomous operation of a vehicle, lacking or unreliable sensor data caused by a degraded visual environment presents difficulties. For example, a controller of the vehicle may have difficulty identifying obstacles in the environment, or orienting the vehicle relative to a surface, such as a road surface or a ground surface. Degraded visual environments likewise disorient manual operators of vehicles. Autonomous and manual operators alike may need to make different decisions for operating the vehicle in a degraded visual environment depending on an operating context of the vehicle. Existing systems and methods for operating a vehicle in a degraded visual environment may struggle to effectively control the vehicle in these different operating contexts.

What is needed is a system for effectively operating a vehicle in a degraded visual environment.

SUMMARY

In an example, a method for controlling a vehicle in a degraded visual environment is described. The method includes identifying a degraded visual environment corresponding to a phase of a route followed by the vehicle. The method includes determining, based on the phase of the route, a first segment of a trajectory of the vehicle along which to search for a location with an improved navigation environment. The method includes causing the vehicle to follow the first segment until: (i) identifying the improved navigation environment, or (ii) reaching an end of the first segment without identifying the improved navigation environment. The method includes determining a second segment of the trajectory based on whether the improved navigation environment has been identified. The method includes causing the vehicle to follow the second segment.

In another example, a system for controlling a vehicle in a degraded visual environment is described. The system includes a vehicle. The vehicle includes a computing device having a processor and memory storing instructions executable by the processor. The instructions are executable by the processor to identify a degraded visual environment corresponding to a phase of a route followed by the vehicle. The instructions are executable by the processor to determine, based on the phase of the route, a first segment of a trajectory of the vehicle along which to search for a location with an improved navigation environment. The instructions are executable by the processor to cause the vehicle to follow the first segment until: (i) identifying the improved navigation environment, or (ii) reaching an end of the first segment without identifying the improved navigation environment. The instructions are executable by the processor to determine a second segment of the trajectory based on whether the improved navigation environment has been identified. The instructions are executable by the processor to cause the vehicle to follow the second segment.

In another example, a non-transitory computer readable medium is described. The non-transitory computer readable medium has stored thereon instructions, that when executed by one or more processors of a computing device, cause the computing device to perform functions. The functions include identifying a degraded visual environment corresponding to a phase of a route followed by a vehicle. The functions include determining, based on the phase of the route, a first segment of a trajectory of the vehicle along which to search for a location with an improved navigation environment. The functions include causing the vehicle to follow the first segment until: (i) identifying the improved navigation environment, or (ii) reaching an end of the first segment without identifying the improved navigation environment. The functions include determining a second segment of the trajectory based on whether the improved navigation environment has been identified. The functions include causing the vehicle to follow the second segment.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1A:
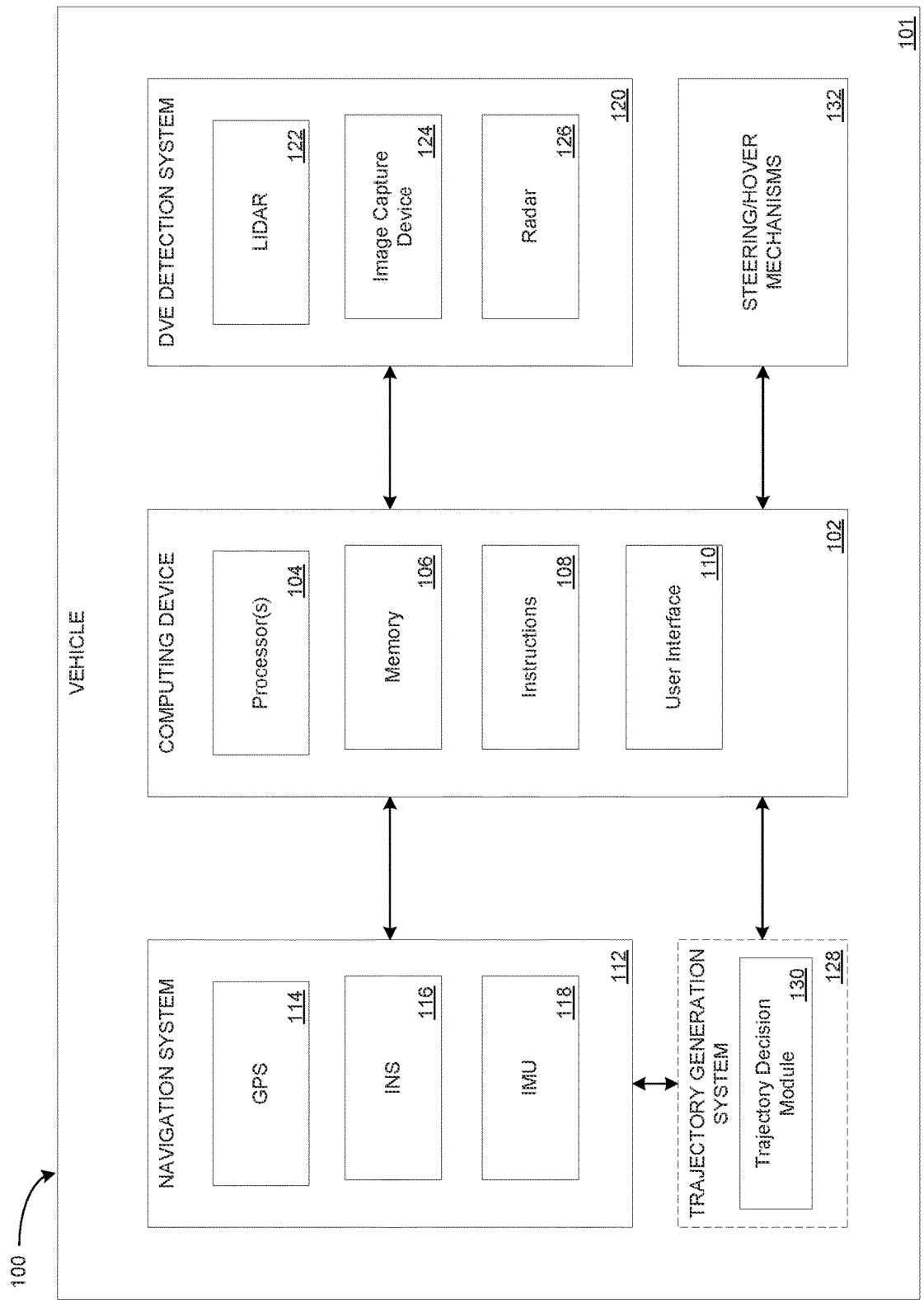
FIG. 1A illustrates a block diagram of a system that includes a vehicle, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for operating a vehicle in a degraded visual environment (DVE) are described. As used herein, the term "degraded visual environment" refers to an environment lacking visual cues used for navigating a vehicle. For example, a DVE may result from one or more of rain, snow, fog, dust, sand, or smoke surrounding the vehicle. In DVE scenarios, a vehicle may receive sensor data that is either lacking or that misrepresents the environment or objects in the environment. Methods and systems are described that allow for automatic or manual navigation within the environment. For purposes of the following description, the terms "automatically" or "autonomously" may involve carrying out the functions programmatically based on sensor data, stored information, machine learning techniques, or the like, without user input and/or instructions. Within this context, functions may still be referred to as automatic or autonomous if they are prompted at some point by user actions.

As used herein, the term "path" refers to a continuous set of positions between two points, such as waypoints of a route. A "trajectory" refers to a velocity (speed and direction) taken while following a path. In some instances herein, a trajectory may be referred to in terms of its path for purposes of simplicity, but it should be understood that the trajectory additionally includes a velocity or velocities for traveling along the path. A "route" refers to at least one path defined by one or more sets of waypoints. A route may include a plurality of phases, each phase corresponding to at least one waypoint.

Within examples, a vehicle operates in different contexts that affect how to navigate within the DVE. For example, an aircraft follows a predetermined route including different phases that are defined by trajectories followed by the aircraft between various waypoints. The plurality of phases includes at least a takeoff phase, a landing phase, and a cruising phase. Depending on the phase of the route, the vehicle determines different trajectories. For example, in a takeoff phase, the vehicle may follow an upward trajectory to search for an improved navigation environment, while in a landing phase, the vehicle may follow a downward trajectory towards an alternate landing location. Accordingly, the methods and systems described herein provide an adaptive way of addressing a DVE experienced by a vehicle. In particular, examples described herein relate to determining trajectories for identifying improved visual conditions based on a context of experiencing the DVE.

The following examples generally depict aircraft implementations, it should be understood that the same systems and methods can be applied to other types of vehicles as well, such as land vehicles or water vehicles.

Turning now to the figures, FIG. 1A illustrates a block diagram of a system 100 that includes a vehicle 101, according to an example implementation. The vehicle 101 includes a computing device 102, a navigation system 112, a DVE detection system 120, a trajectory generation system 128, and steering/hover mechanisms 132. Other devices, systems, devices, modules, software, data stores, and the like can also be included. Further, within examples, various components described with respect to FIG. 1A may be integrated into a singular computing device or system, separated into further discrete components, or otherwise rearranged to achieve similar functionality to that described herein. Further, various systems, devices, and mechanisms, can be implemented in either a software or hardware context.

The computing device 102 includes one or more processor(s) 104, a memory 106, instructions 108, and a user interface 110. The one or more processor(s) 104 may be general-purpose processors or special purpose processors (e.g., digital signal processors, application specific integrated circuits, etc.). The one or more processor(s) 104 are configured to execute the instructions 108 (e.g., computer-readable program instructions) that are stored in the memory 106 to provide the functionality of computing device 102, and related systems and methods described herein.

The memory 106 includes or takes the form of one or more computer-readable storage media that are read or accessed by the processor(s) 104. The computer-readable storage media can include volatile and/or non-volatile storage components, such as optical, magnetic, organic or other memory or disc storage, which can be integrated in whole or in part with the processor(s) 104. The memory 106 is considered non-transitory computer readable media. In some examples, the memory 106 can be implemented using a single physical device (e.g., one optical, magnetic, organic or other memory or disc storage unit), while in other examples, the memory 106 can be implemented using two or more physical devices. The memory 106 thus is a non-transitory computer readable storage medium, and instructions 108 executable by the processor(s) 104 are stored on the memory 106. The instructions 108 include computer executable code, and can be executed by the processor(s) 104 to achieve functionality described herein.

The user interface 110 includes a mouse, a keyboard, a touchscreen, a microphone, a gesture recognition system, a combination thereof, or any other means of receiving user input. In particular, the user interface 110 is configured to receive input from an operator (e.g., a pilot or a driver) of the vehicle 101, or a remote technician of the vehicle 101, for example. Examples described herein relate to autonomous operation of a vehicle. Accordingly, the user interface 110 may not be necessary to perform functionality described herein. Further, while the user interface is depicted as being a part of the vehicle 101, it should be understood that the user interface 110 may be integrated in a separate device that is in communication with the vehicle 101.

As shown in FIG. 1A, the computing device 102 is communicatively coupled to the navigation system 112, the DVE detection system 120, the trajectory generation system 128, and the steering/hover mechanisms 132. Though not depicted in FIG. 1A, each of these components of the vehicle 101 may include processor(s), memory, and instructions configured similarly to the one or more processor(s) 104, the memory 106, and the instructions 108 as described above, though each may include instructions executable to achieve a distinct functionality. Further, though these components are not depicted as being in direct communication (rather, they are shown being in communication via the computing device 102), each of these components may directly communicate with one another, or operate independently without receiving communications from one another.

The navigation system 112 includes a Global Positioning System (GPS) 114, an Inertial Navigation System (INS) 116, and an Inertial Measurement Unit (IMU) 118. The navigation system 112 and/or one or more of its components is configured to determine a location, an orientation, and an altitude of the vehicle 101. More particularly, one or more of the GPS 114, the INS 116, and the IMU 118 may obtain sensor data indicative of a location, orientation/attitude, and altitude (though not depicted, an altimeter, for example, may also be included) of the vehicle 101. This information, either in the form of unprocessed sensor data, or as targeted information indicative of the location, orientation, attitude, and altitude of the vehicle 101, may be transmitted to the computing device 102. For example, the navigation system 112 may transmit a simplified representation of the sensor data. As described below, the computing device 102 and/or one or more additional components of the vehicle 101 may use this information in generating and selecting a flight path or trajectory for the vehicle 101.

The DVE detection system 120 includes a Light Detection and Ranging (LIDAR) device 122, an image capture device 124 (e.g., a camera, a light sensor array, or another imaging device or system), and a radar device 126. Other devices may be included as well. The DVE detection system 120 and/or one or more of its components, is configured for obtaining sensor data indicative of an environment of the vehicle 101. For example, one or more of the LIDAR device, image capture device, and the radar device 126 may periodically scan an area surrounding the vehicle 101, such as an area corresponding to a planned flight path, to obtain data indicative of aspects of the environment. The sensor data may include three-dimensional (3D) point cloud data, image data, or other data that indicates whether a DVE is present (e.g., detecting a number of objects exceeding an expected number). This information, either in the form of unprocessed sensor data, or as targeted information indicative of the environment surrounding the vehicle 101, may be transmitted to the computing device 102. For example, the DVE detection system may transmit a representation of the sensor data, a measure of confidence in the obtained data (e.g., an indication that data is noisy, or that one or more sensors have conflicting data), or an indication that a DVE has been detected. As described below, the computing device 102 and/or one or more additional components of the vehicle 101 may use this information in generating and selecting a trajectory for the vehicle 101.

The trajectory generation system 128 includes a trajectory decision module 130. The generation system may receive information from the navigation system 112 and from the computing device 102 to determine a trajectory including a flight path for the aircraft to follow. The trajectory generation system 128 may be a standalone computing device, or alternatively be included as part of the computing device 102, the navigation system 112, or any other component of the vehicle 101. Further details relating to the trajectory generation system 128 and the trajectory decision module 130 are described below with respect to FIG. 1B.

The steering/hover mechanisms 132 include one or more rotors, thrusters, stabilizers, ailerons, elevators, control surfaces, or other controllable operational devices of the vehicle 101. The computing device 102 may send control signals to the steering/hover mechanisms 132 in order to effectuate navigation, guidance, and/or control of the vehicle 101 on a determined trajectory and/or flight path.

Figure 1B:
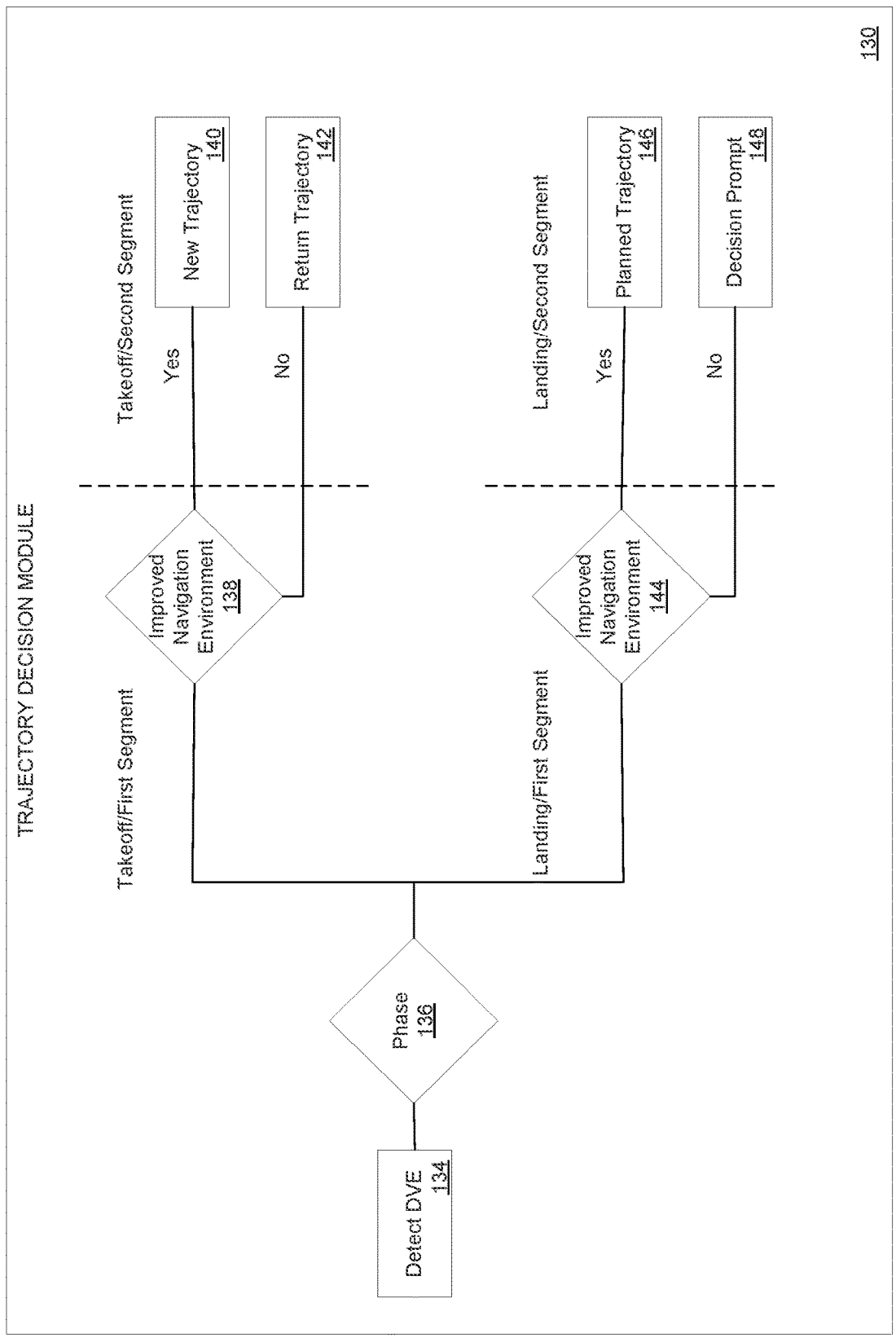
FIG. 1B illustrates a flowchart of a trajectory decision module of the vehicle, according to an example implementation.

FIG. 1B illustrates a flowchart of a trajectory decision module 130 of the vehicle 101, according to an example implementation. In particular, FIG. 1B shows a logical diagram describing a simplified method for determining a trajectory using the trajectory decision module 130. The trajectory decision module 130 may be a software program having instructions stored in memory on the trajectory generation system 128 and executable to perform functionality shown in FIG. 1B. The flowchart representing aspects of this functionality includes blocks 134-148.

At block 134, functions include detecting a DVE. This may involve comparing sensor data obtained by one or more sensors on the vehicle 101 (e.g., one or more sensors of the DVE detection system 120) to expected data, comparing data processing outputs to an expected data processing output, comparing first sensor data from a first sensor to second sensor data from a second sensor, or failing to identify one or more objects or surfaces in the environment using sensor data. Additional details of detecting the DVE are provided below with respect to FIG. 5.

At block 136, functions include determining a phase of a route of the vehicle 101. The phase might be a starting phase, an ending phase, or a traveling phase. For example, the starting phase may correspond to a takeoff phase of an aircraft, the ending phase may correspond to a landing phase of the aircraft, and the traveling phase may correspond to a cruising phase of the aircraft. Within examples, the computing device 102 may determine the phase based on one or more predetermined waypoints of the route compared to a position of the vehicle 101. Within examples, block 136 can be performed prior to or concurrently with block 134. Other blocks in the trajectory decision module 130 are performed based on which phase is determined at block 136.

Depending on the determined phase of the route of the vehicle 101, a first segment of a trajectory along which to search for an improved navigation environment. Further details of determining the first segment of the trajectory are described below with respect to FIGS. 2A-3E, and FIG. 5.

In the context of a takeoff of the vehicle 101, at block 138, functions include determining whether an improved navigation environment is detected while traveling along the first segment of the trajectory. As used herein, the term "improved navigation environment" refers to determining a threshold increase in similarity between the sensor data and the expected data (e.g., a threshold increase in correlation), an improved data processing output (e.g., a number of detected obstacles falling below a threshold number), a threshold increase in data resolution, a threshold increase in data similarity (e.g., based on comparing data from two or more sensors), or an increased confidence in detecting an object or surface (e.g., using statistical metrics such as a confidence interval, correlation, or 1-p-value) relative to the DVE or relative to one or more benchmarks associated with an improved navigation environment. The improved navigation environment is detected using sensor data from one or more sensors in DVE detection system 120. Responsive to detecting an improved navigation environment, at block 140, functions include determining a new trajectory for the vehicle 101. For example, the new trajectory may start at a position at which the improved navigation environment is detected, and end at a previously defined waypoint on the route of the vehicle 101. As another example, the new trajectory may include an ascending hover that ends at a predetermined altitude, and which then transitions to a cruising phase of the vehicle 101. Responsive to not detecting the improved navigation environment, at block 142, functions include determining a return trajectory to a starting position of the vehicle 101. For example, the return trajectory may start at an end point of the first segment of the trajectory, and end at a takeoff point of the vehicle 101. The new trajectory or returning to the takeoff point serves as a second segment following the first segment of the trajectory.

In the context of landing the vehicle 101, at block 144, functions include determining whether an improved navigation environment is detected while traveling along the first segment of the trajectory. Responsive to detecting an improved navigation environment, at block 146, functions include following a planned trajectory. For example, the first segment of the trajectory includes an end point at which the vehicle 101 determines if an improved navigation environment is detected, and the planned trajectory of block 146 may be determined at substantially the same time as the first segment. If the improved navigation environment is detected, the vehicle 101 continues along the planned trajectory. The planned trajectory serves as a second segment following the first segment of the trajectory. Responsive to not detecting the improved navigation environment, at block 148, functions include a providing a decision prompt of the vehicle 101. For example, the decision prompt may include a prompt to switch from an autonomous mode of operation of the vehicle 101 to a manual mode of operation of the vehicle 101, a prompt to determine a second segment of the trajectory that deviates from the planned trajectory of block 146, or a prompt to follow the planned trajectory of block 146 even without detecting an improved navigation environment. In this manner, the trajectory decision module allows for adaptive contextual control of the vehicle 101 after detecting a DVE.

Figure 2A:
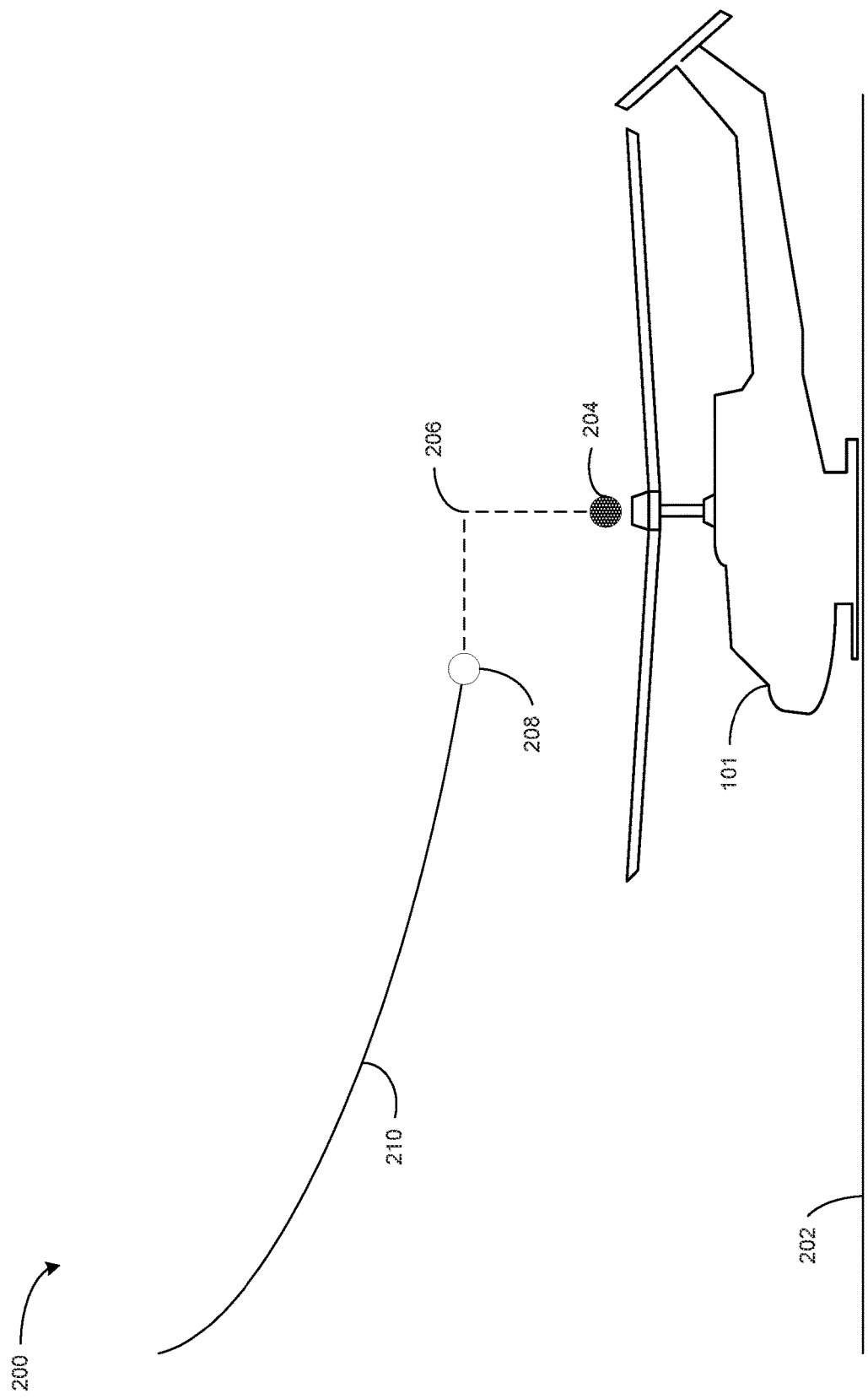
FIG. 2A illustrates a vehicle in a takeoff phase of a route with a clear visual environment, according to an example implementation.

FIG. 2A illustrates the vehicle 101 in a takeoff phase 200 of a route with a clear visual environment, according to an example implementation. In particular, FIG. 2A shows an example scenario in which the vehicle 101 does not detect a DVE. In the takeoff phase 200, the vehicle initially rests on a ground surface 202, and begins to approach a predetermined hover point 208 at which the predetermined takeoff trajectory 210 begins. From a takeoff point 204, the vehicle 101 follows a translation path 206 in which its position is translated to reach a hover point 208. Though the translation path 206 is depicted as including a vertical segment and a horizontal segment, it should be understood that the translation path may include more or fewer than two segments. The hover point 208 corresponds to a takeoff waypoint for the vehicle 101. At or before the hover point 208, the vehicle 101 may rotate to align with a direction of a flight path for the takeoff phase. At or before the hover point, the DVE detection system 120 scans in a direction of a takeoff trajectory 210, or more generally in an environment surrounding the vehicle 101, to determine whether a DVE is detected. In the example depicted in FIG. 2A, the environment does not include a DVE, so the vehicle 101 follows the takeoff trajectory 210.

Figure 2B:
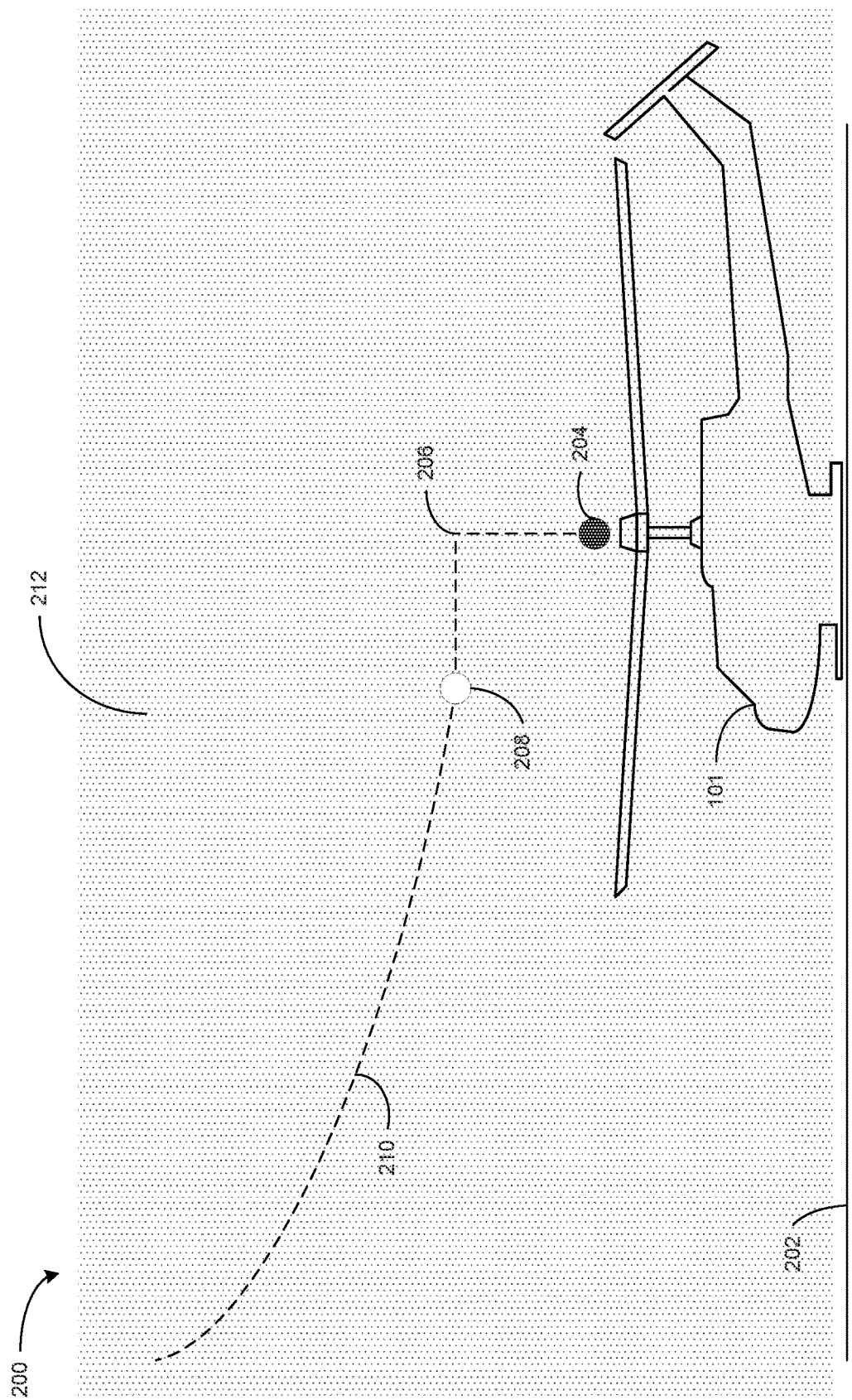
FIG. 2B illustrates the vehicle in a takeoff phase of a route with a degraded visual environment, according to an example implementation.

FIG. 2B illustrates the vehicle 101 in the takeoff phase 200 of a route with a degraded visual environment 212, according to an example implementation. The vehicle 101 is depicted as a helicopter, and in the example scenario depicted in FIG. 2B the degraded visual environment 212 may result from dust or sand being kicked up into the air by rotors of the vehicle 101, from fog, rain, snow, or other factors that limit visibility. One or more sensors on vehicle 101 scan the environment while vehicle 101 is on the ground surface 202 or while the vehicle travels towards the hover point 208. In the example scenario, the vehicle 101 detects the DVE. Detecting a DVE is described in further detail below with respect to FIG. 5.

Responsive to detecting the DVE, the vehicle 101 (e.g., trajectory generation system 128 of vehicle 101) determines a first segment of a trajectory for handling the DVE, and a second segment for handling the DVE. The first segment and the second segment may be alterations of the translation path 206 and the takeoff trajectory 210. For example, rather than approaching the hover point 208 using the translation path 206, the vehicle 101 may instead follow an upward trajectory while searching for an improved navigation environment. Further details of this process are described below with respect to FIGS. 2C, 2D, and 2E.

Figure 2C:
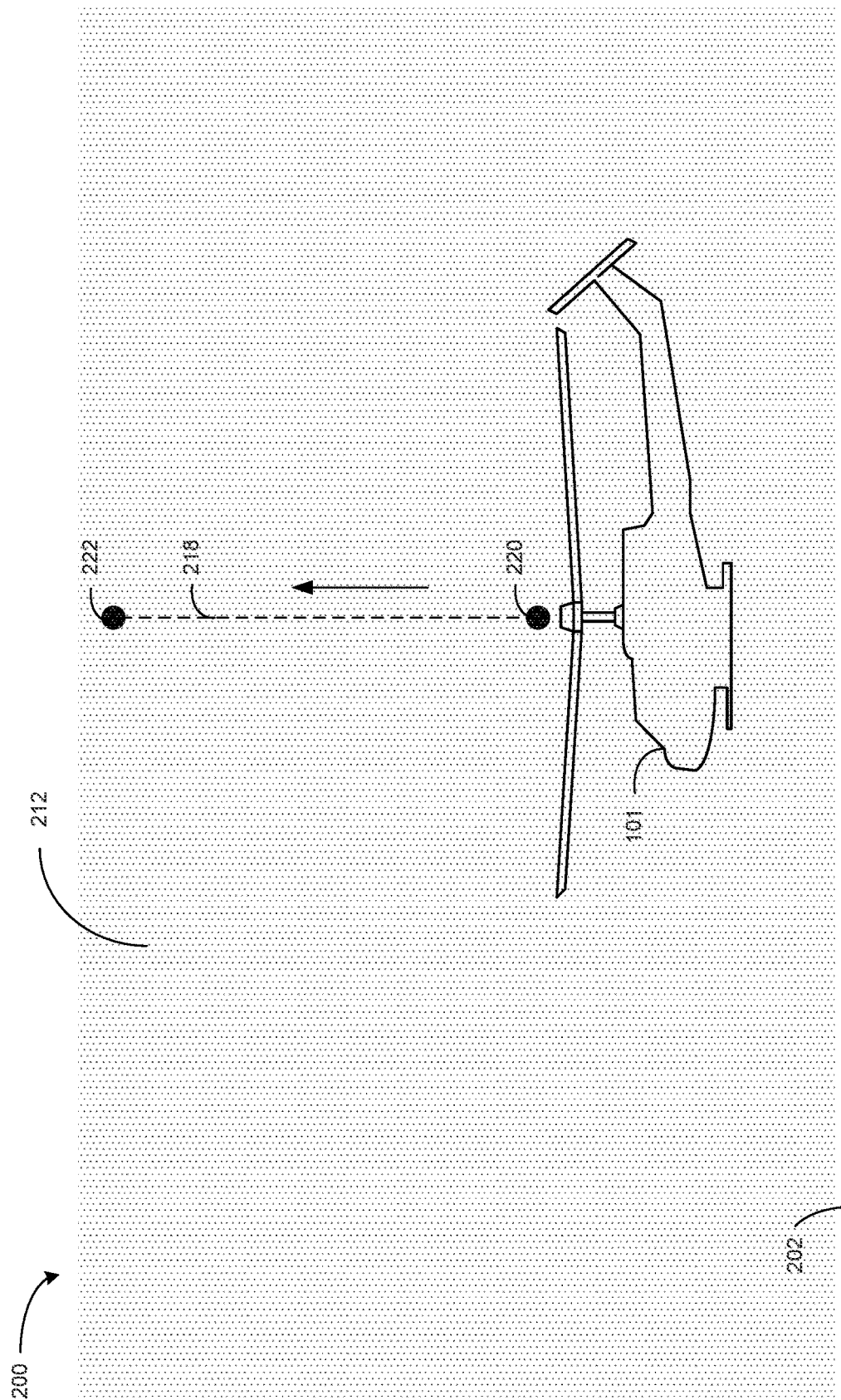
FIG. 2C illustrates the vehicle following a first segment of a trajectory according to an example implementation.

FIG. 2C illustrates the vehicle 101 following a first segment 218 of a trajectory according to an example implementation. The first segment 218 of the trajectory follows a path between a first waypoint 220 and a second waypoint 222. The first waypoint 220 corresponds to a point at which the DVE is detected, and the second waypoint 222 corresponds to a predetermined altitude, such as a maximum hover height of the vehicle 101. As shown in FIG. 2C, the vehicle 101 travels upward along the trajectory to search for an improved navigation environment. While searching for the improved navigation environment, the one or more sensors on the vehicle 101 may continually scan for signs of increased visibility. Detecting an improved navigation environment is described in further detail below with respect to FIG. 5.

Figure 2D:
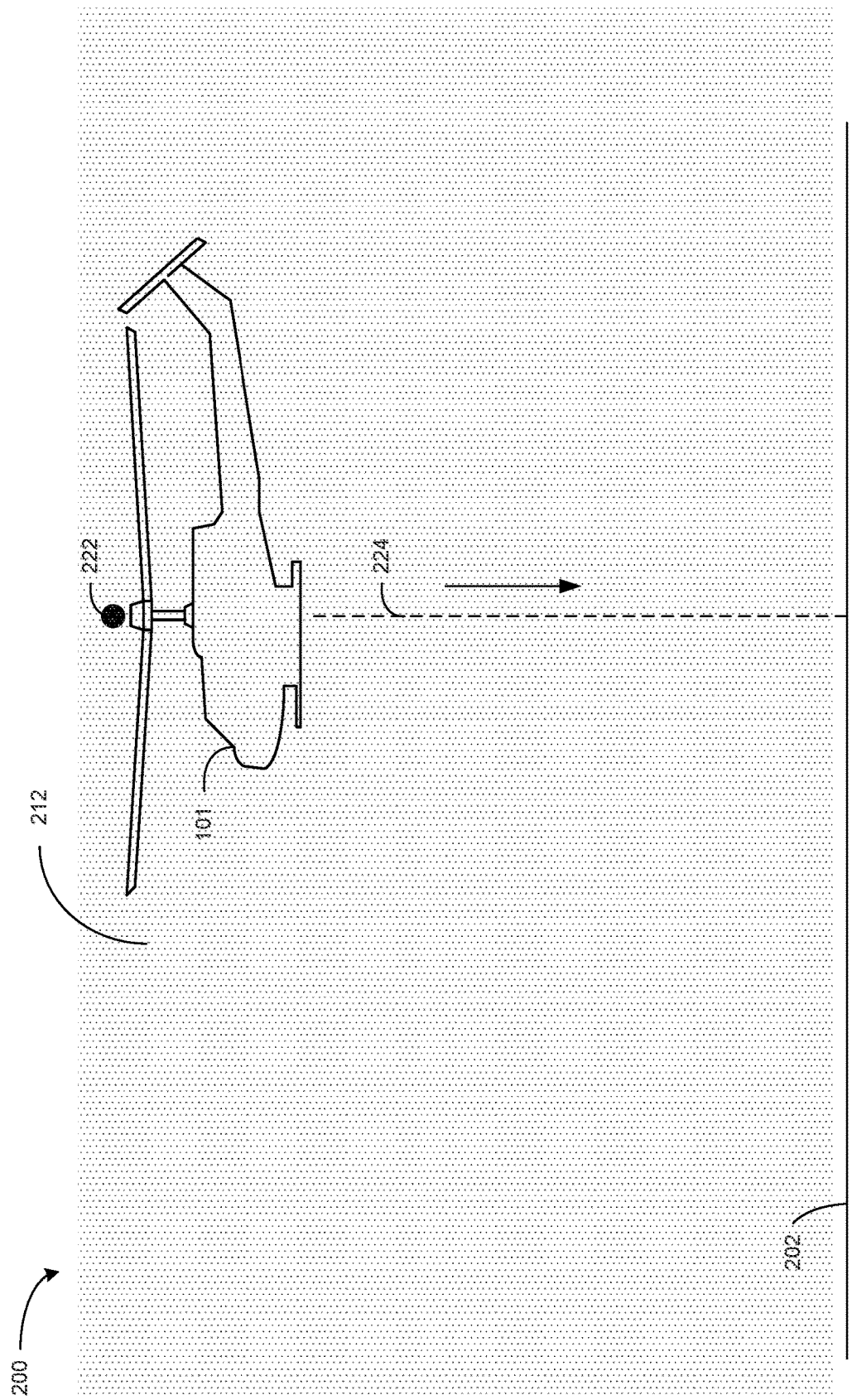
FIG. 2D illustrates the vehicle following a second segment of the trajectory, according to an example implementation.

FIG. 2D illustrates the vehicle 101 following a second segment 224 of the trajectory, according to an example implementation. In particular, FIG. 2D shows the second segment 224 after failing to detect an improved navigation environment while following the first segment 218 of the trajectory. As shown in FIG. 2D, the vehicle 101 remains within the degraded visual environment 212 after reaching the second waypoint 222. After reaching the second waypoint 222 of the first segment 218, the vehicle 101 determines a return trajectory that starts at the second waypoint 222, and ends at the ground surface 202. The vehicle 101 may wait for a predetermined period of time prior to making a second attempt at searching for an improved navigation environment. For example, the predetermined time may be a default threshold, such as 15 minutes, or a threshold associated with a particular type of DVE. For example, if the DVE is determined to be associated with sand or dust, the threshold may be 2 minutes, and if the DVE is determined to be associated with snow or fog, the threshold may be longer. Other thresholds can be used for different types of DVEs. In these examples, the vehicle 101 may also determine a type of DVE using the sensor data, such as by determining that the sensor data closely matches a data signature of a particular type of DVE.

Though FIG. 2D illustrates the vehicle 101 taking a direct path along the second segment 224 to the ground surface 202, it should be understood that other paths are possible for the second segment 224. For example, the second segment 224 may lead to a last known location without a DVE. In these examples, the vehicle 101 may rely on GPS, IMU or other data in order to navigate while ignoring sensor data used to detect the DVE, such as image data or LIDAR data.

Figure 2E:
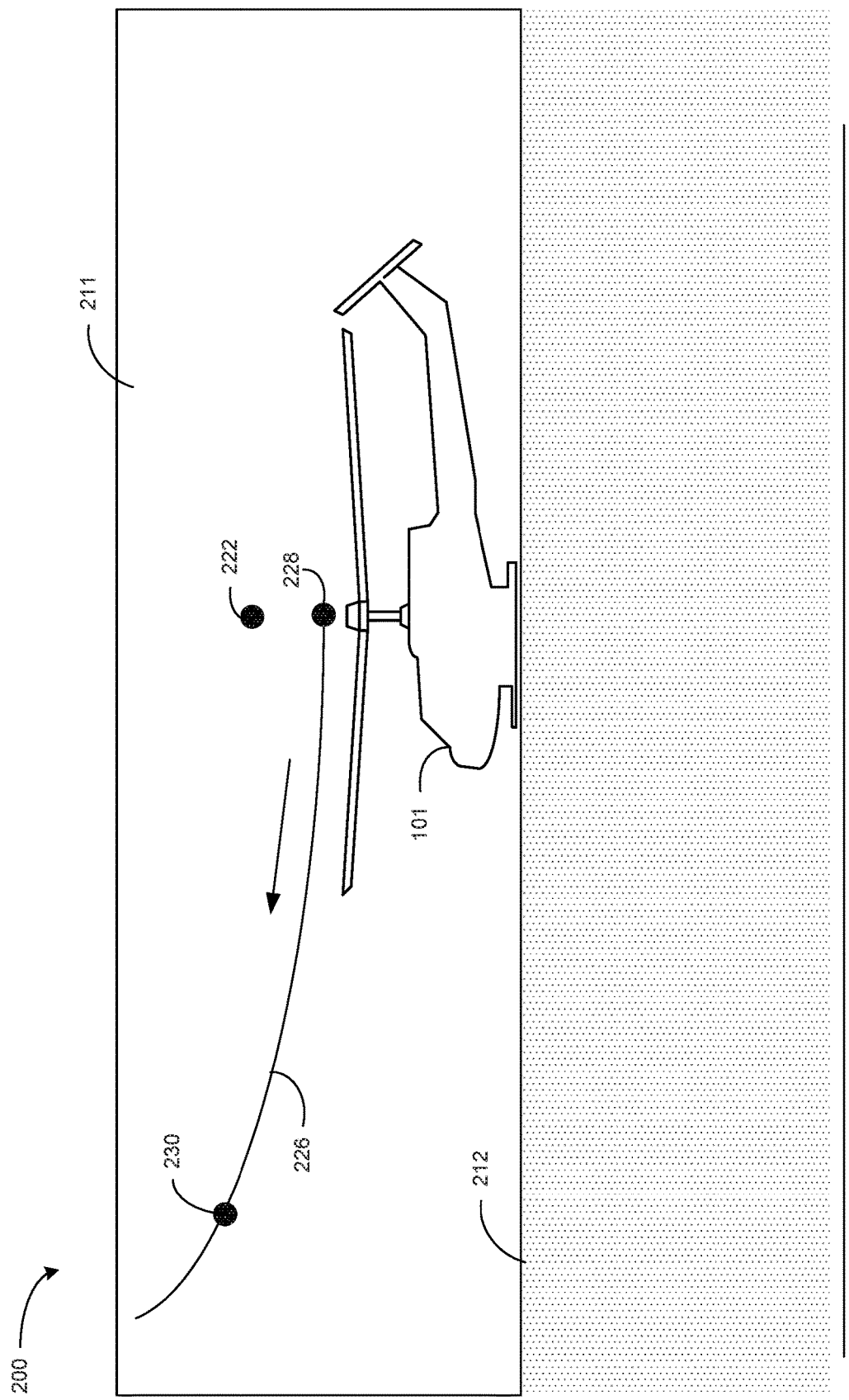
FIG. 2E illustrates the vehicle following an alternative second segment of the trajectory, according to an example implementation.

FIG. 2E illustrates the vehicle 101 following an alternative second segment 226 of the trajectory, according to an example implementation. In the example scenario depicted in FIG. 2E, the vehicle 101 detects an improved navigation environment 211 prior to reaching the second waypoint 222 of the first segment 218. The alternative second segment 226 starts at a point 228 at which the improved navigation environment 211 is detected, and ends at a predetermined waypoint 230 that is included in the route of the vehicle 101. For example, predetermined waypoint 230 is associated with an end to the takeoff phase of the route.

FIGS. 2A-2E show the vehicle 101 in multiple example scenarios associated with a helicopter. It should be understood that similar scenarios may exist for other types of aircraft and rotorcraft, such as a vertical take-off and landing (VTOL) aircraft and short take-off and landing aircraft (STOL). Further, it should be understood that there are alternative contexts for determining trajectories in the presence of a DVE for still other types of aircraft, such as a fixed wing aircraft, and for other types of vehicles, such as land vehicles or marine vehicles.

Figure 3A:
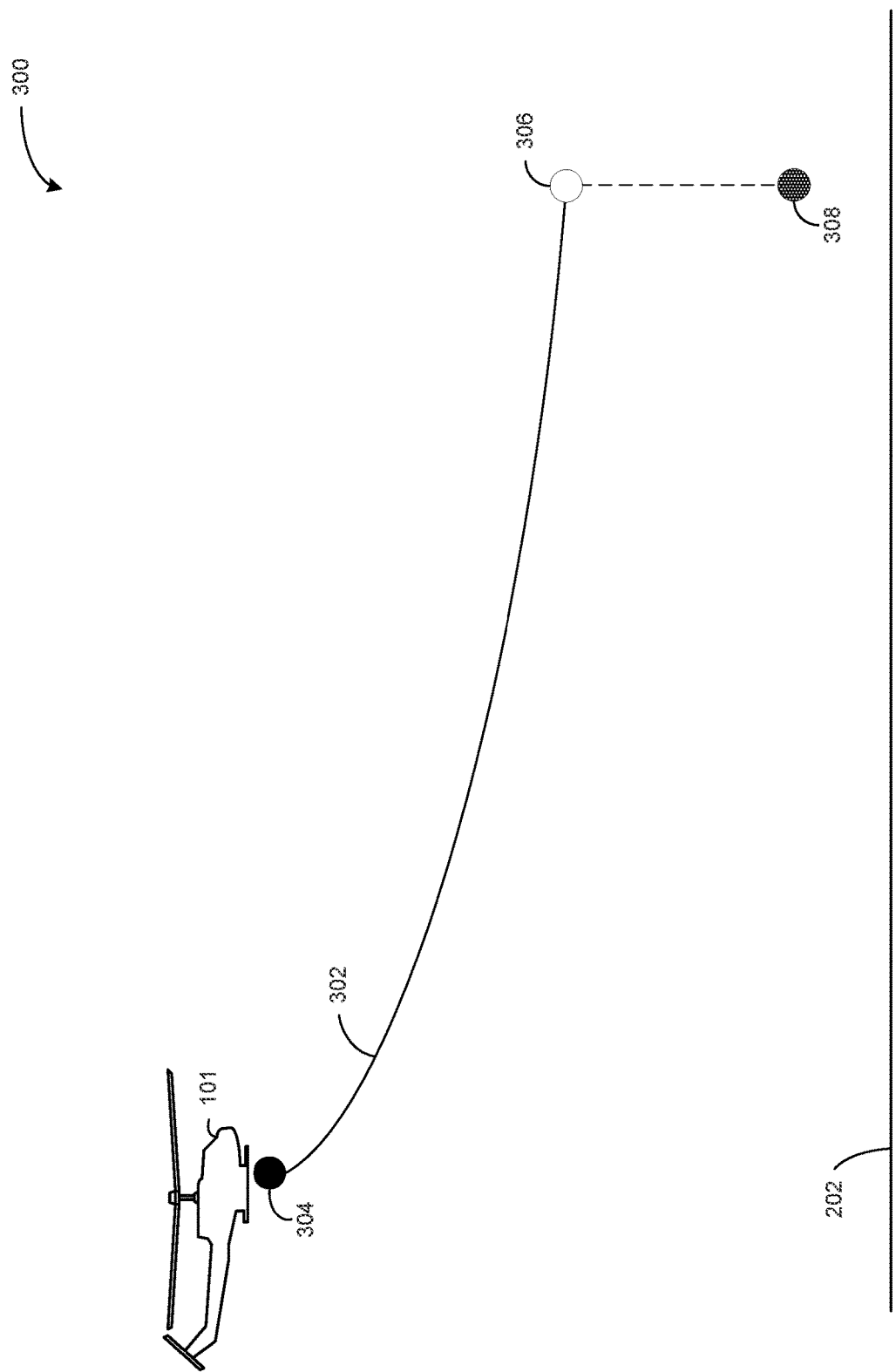
FIG. 3A illustrates a vehicle in a landing phase of a route with a clear visual environment, according to an example implementation.

FIG. 3A illustrates the vehicle 101 in a landing phase 300 of a route with a clear visual environment, according to an example implementation. In particular, FIG. 3A depicts a scenario in which the vehicle 101 does not detect a DVE. In the landing phase 300, the vehicle 101 follows a trajectory defined by a path 302 that starts at a first waypoint 304 and ends at a second waypoint 306. The second waypoint 306 corresponds to a hover point at which the vehicle maneuvers to reaching a landing location 308 on the ground surface 202. Because the vehicle 101 does not detect a DVE in the scenario depicted in FIG. 3A, the vehicle 101 continues to travel normally along the route during the landing phase 300.

Figure 3B:
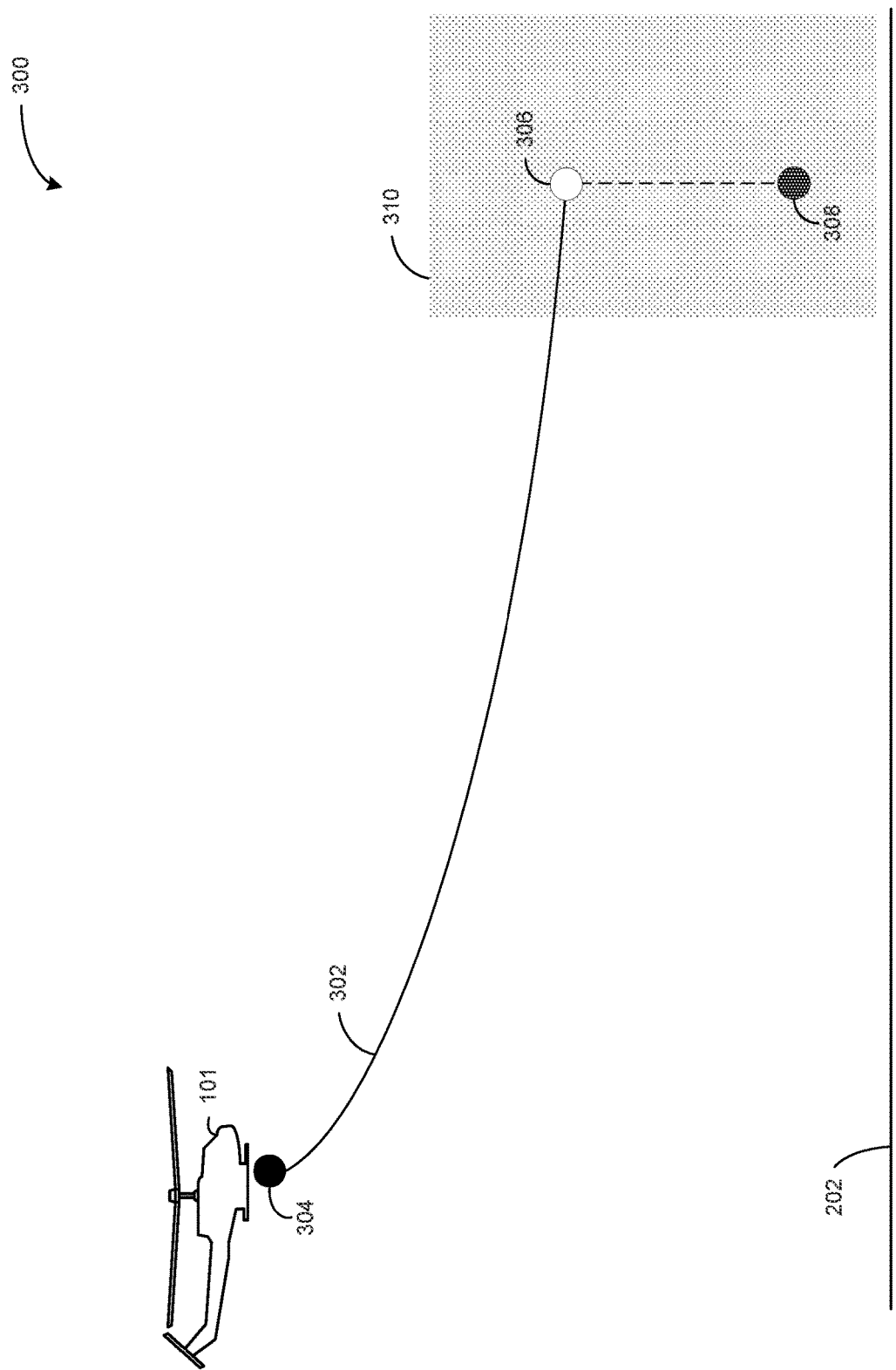
FIG. 3B illustrates the vehicle in a landing phase of a route with a degraded visual environment, according to an example implementation.

FIG. 3B illustrates the vehicle 101 in the landing phase 300 of a route with a degraded visual environment 310, according to an example implementation. In particular, the scenario depicted in FIG. 3B shows the vehicle 101 having detected a remote DVE. Detecting the DVE in this context may include failing to detect an object or the ground surface 202 from an altitude at which such details are expected to be identifiable by one or more sensors on the vehicle 101, detecting an unexpected aspect of the environment, such as detecting more than a threshold/expected number of obstacles in the environment, or receiving a report of a DVE from another vehicle or a remote device. For example, a weather report may indicate that a target landing location of the route is surrounded by heavy fog, rain, a sand storm, or other conditions associated with a DVE. Further details of determining a DVE are described below with respect to FIG. 5.

Figure 3C:
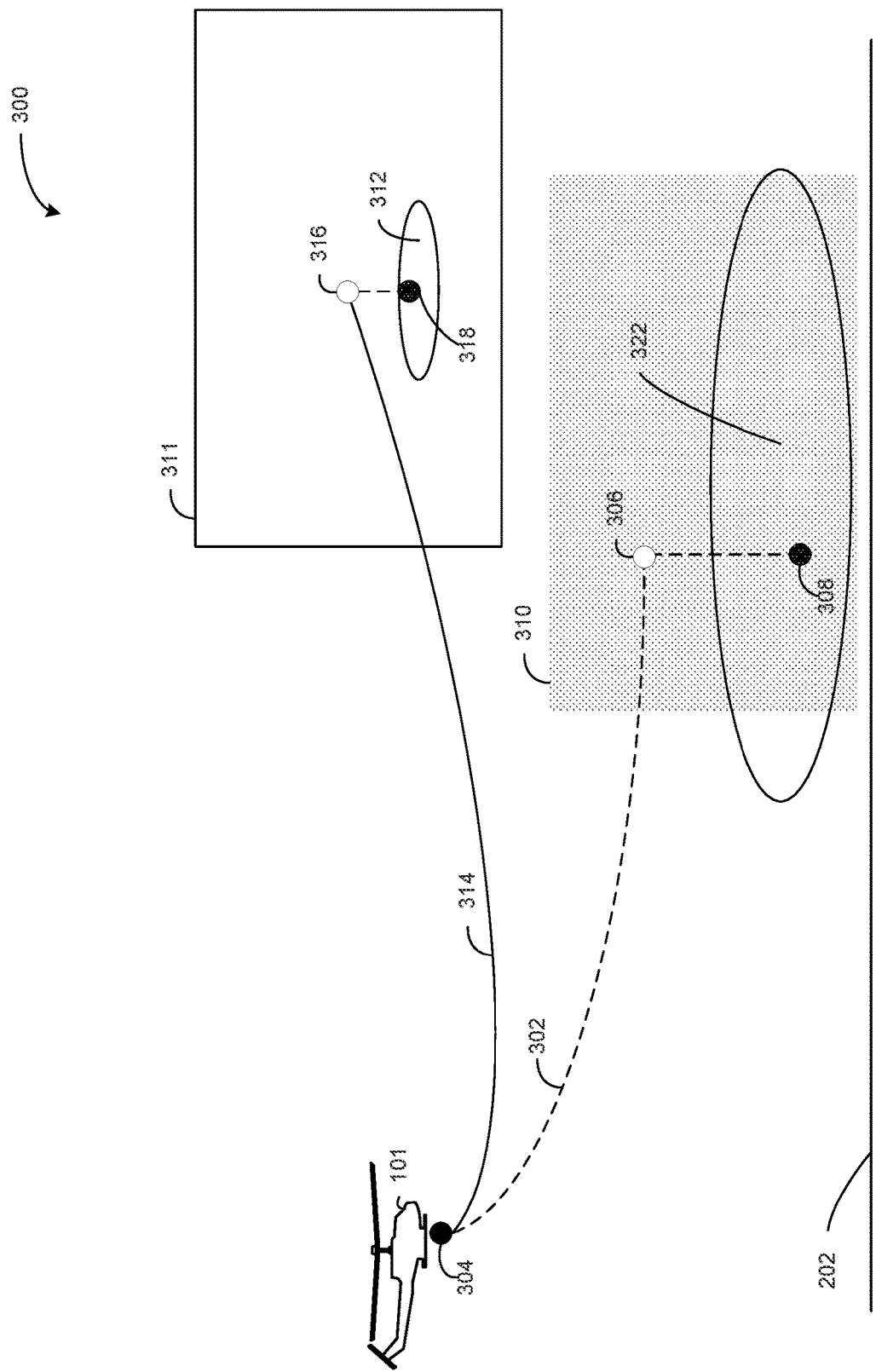
FIG. 3C illustrates the vehicle determining a first segment of a trajectory according to an example implementation.

FIG. 3C illustrates the vehicle 101 determining first segment of a trajectory according to an example implementation. In particular, FIG. 3C depicts a scenario in which the vehicle 101 determines an alternative landing location 318 that corresponds to an area 312 with no identified DVE. The first segment of the trajectory is defined by a path 314 that starts at a first waypoint 304 and ends at a second waypoint 316 associated with the alternative landing location 318. The vehicle 101 may include a database of landing locations or have access to a database of landing locations that includes landing ratings for each landing location. For example, landing ratings indicate how many times the vehicle 101 or a plurality of vehicles have landed at a given landing location, the reliability of a ground surface at the landing location, typical wind conditions at the landing location, and additional or alternative factors. These factors are scored and weighted to form a landing rating, perhaps using a cost function or another cost-benefit calculation.

Determining the alternative landing location 318 is part of determining a trajectory along which to search for an improved navigation environment. For example, in the landing phase 300, determining the first segment may include a decision prompt to an autonomous or manual operator indicating available landing locations and corresponding landing ratings, distance, time, and other considerations in order to determine whether to deviate from the route. The decision prompt may coincide with detecting the degraded visual environment 310, and may either include a query to an autonomous controller of the vehicle 101 (e.g., computing device 102) or a request presented on a user interface to a manual operator (e.g., the user interface 110) In view of these considerations, the first segment may follow a trajectory towards the alternative landing location 318 or another alternative location, or the first segment may follow a predetermined trajectory associated with the route (e.g., along a trajectory that follows path 302).

Figure 3D:
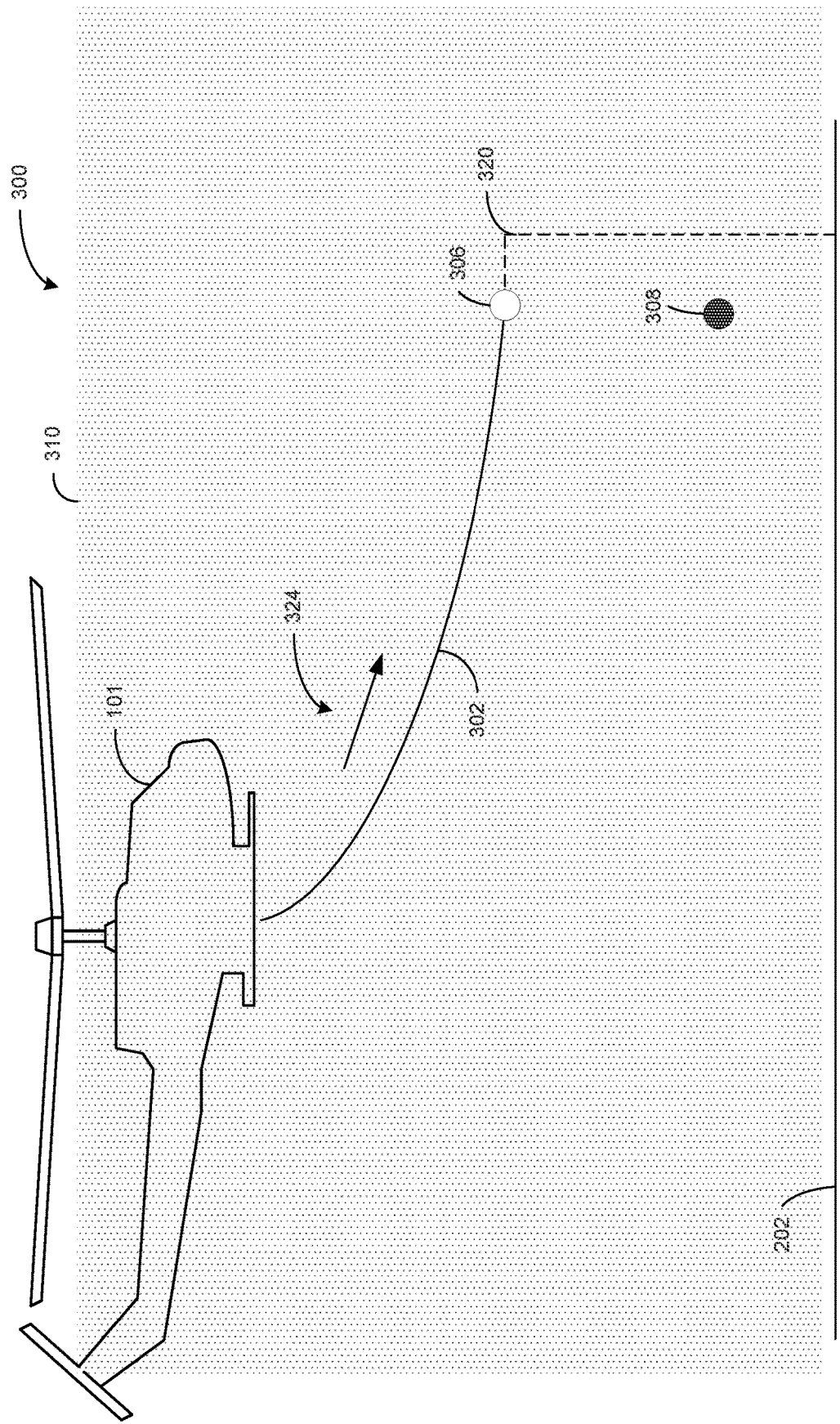
FIG. 3D illustrates the vehicle determining a second segment of the trajectory in a degraded visual environment, according to an example implementation.

FIG. 3D illustrates the vehicle 101 determining a second segment 320 of the trajectory in the degraded visual environment 310, according to an example implementation. In particular, FIG. 3D depicts a scenario in which the vehicle 101 progresses to the landing location 308 despite detecting the degraded visual environment 310. In this context, determining a first segment corresponds to following a predetermined route associated with the path 302. While following the path 302, the vehicle 101 may continue to scan for an improved navigation environment, such as an alternative landing location within an area 322 surrounding the landing location 308. In some examples, the first segment may diverge from the predetermined route while the vehicle 101 searches for an improved navigation environment.

In the scenario depicted in FIG. 3D, the degraded visual environment 310 has not dissipated by the time the vehicle 101 approaches the second waypoint 306 while following a first segment 324 of the trajectory. In this scenario, the vehicle 101 may enter the degraded visual environment 310 responsive to one or more decision prompts, and may involve switching from an autonomous mode of operation to a manual mode of operation, or switching off or ignoring sensor data from one or more sensors (e.g., an RGB camera and/or a LIDAR device) while navigating the vehicle 101. For example, within the degraded visual environment 310, the vehicle relies on GPS data, radar data, or other non-visual data rather than visual data such as RGB camera data or LIDAR data.

After reaching an end of the first segment 324 of the trajectory at the second waypoint 306, the vehicle 101 follows a second segment 320 of the trajectory until reaching the ground surface 202. As shown in FIG. 3D, the second segment 320 might not exactly correspond with the landing location 308 due to less visual information being available to the vehicle 101 while navigating in the degraded visual environment 310. For example, directly after, or nearly directly after, reaching the second waypoint 306, the vehicle descends towards the ground surface 202.

Figure 3E:
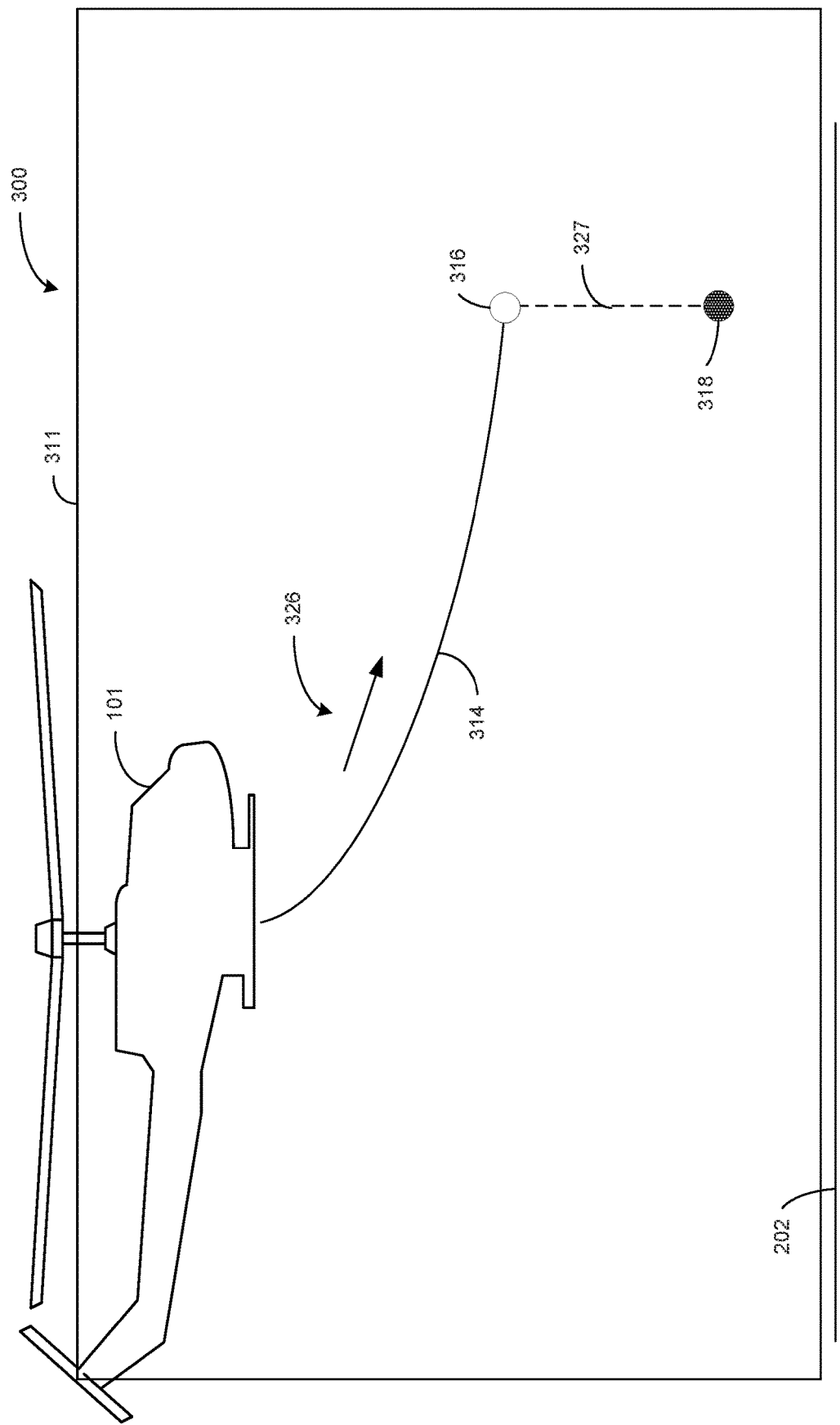
FIG. 3E illustrates the vehicle determining a second segment of the trajectory in a clear environment, according to an example implementation.

FIG. 3E illustrates the vehicle 101 determining a second segment 327 of the trajectory in a clear environment, according to an example implementation. In particular, FIG. 3E depicts a scenario in which the vehicle 101 follows a first segment 326 of a trajectory along the path 314 corresponding to an improved navigation environment 311. While following the first segment 326, the vehicle 101 monitors sensor data or incoming reports to confirm that the improved navigation environment 311 persists, and may re-asses the first segment 326 if a DVE is encountered. Accordingly, in this context, the vehicle 101 is considered to be "searching" for the improved navigation environment 311 at least because an environment surrounding the alternative landing location 318 might not be observable at the first waypoint 304 (shown in FIG. 3C). As shown in FIG. 3E, the second segment 327 of the trajectory begins at the second waypoint 316 and ends at the alternative landing location 318. In this manner, determining a first segment and second segment of a trajectory during a landing phase 300 of a route differs depending on context and based on one or more decision prompts of the vehicle 101, allowing for adaptive trajectories during the landing phase 300.

In alternative examples, the vehicle 101 may identify a DVE while approaching a landing location, such as the alternative landing location 318. For example, in examples where the vehicle 101 is a helicopter, rotor downwash may disturb dust or sand at the landing location, thereby obscuring relevant visual cues and causing the DVE. In these examples, after detecting the DVE, the vehicle 101 may selectively ignore the sensor data from one or more sensors after detecting the DVE, and continue along a predetermined trajectory, perhaps relying on other sensor data, such as GPS data, or previously determined information. For example, in FIG. 3E, the vehicle 101 may detect the DVE while following the second segment 327, but continue towards the alternative landing location 318. As in the example in FIG. 3D, the second segment 327 might not exactly correspond with the alternative landing location 318 due to less sensor data being available to the vehicle 101 while navigating in the DVE.

Figure 4:
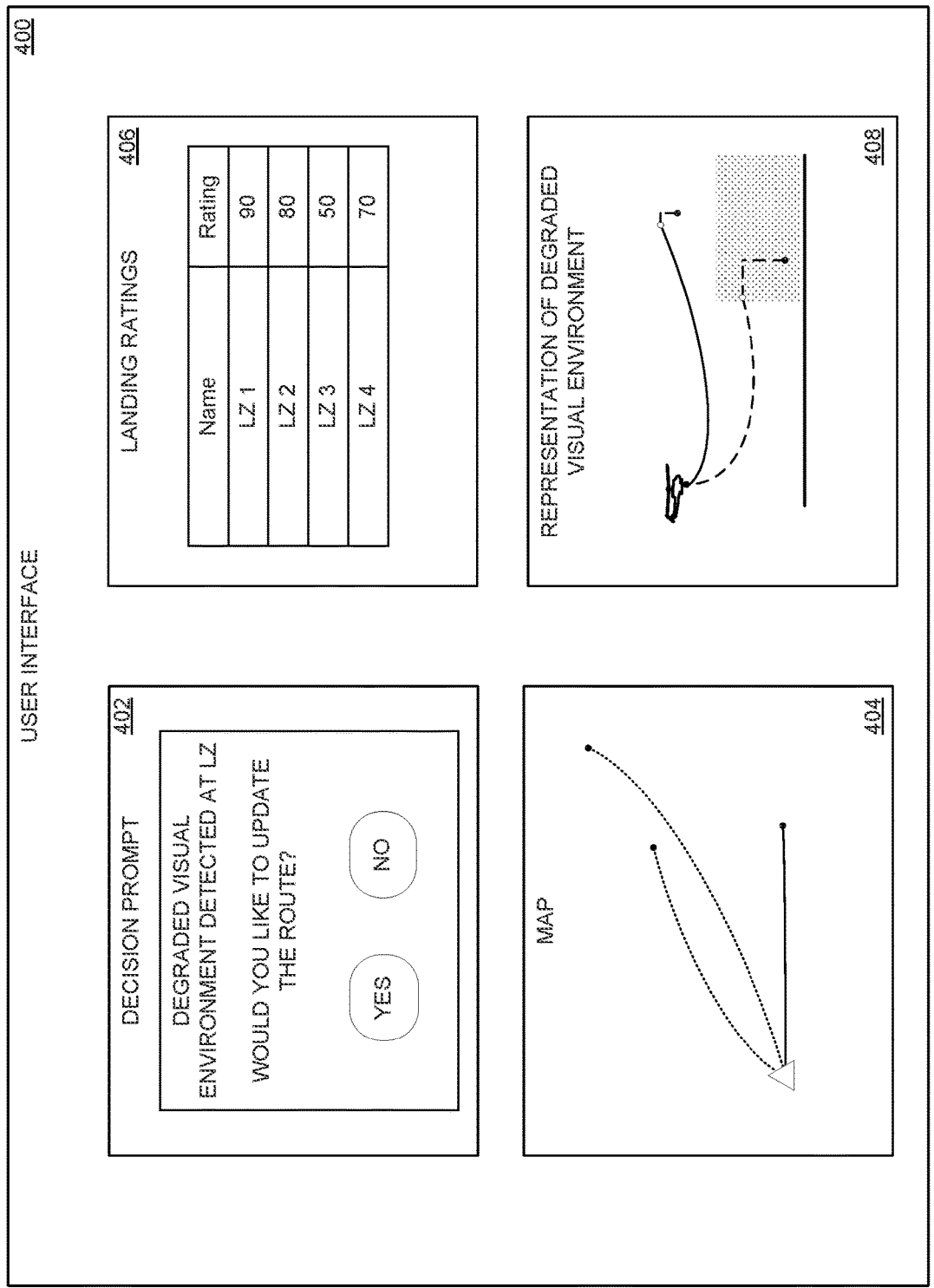
FIG. 4 illustrates a user interface, according to an example implementation.

FIG. 4 illustrates a user interface 400, according to an example implementation. In particular, Figure shows the user interface 400 in the context of providing a decision prompt 402 after detecting a DVE. In this scenario, the user interface includes the decision prompt 402, a map 404, a plurality of landing ratings 406 corresponding to alternative landing locations, and a representation of the DVE 408. Other information, such as priority of landing at a target landing location of the route, fuel status, time cost of re-routing, and other factors may be presented in the user interface 400. This allows a manual operator of the vehicle 101 to assess the costs and benefits of following an alternative trajectory. Similar information is considered programmatically by an autonomous controller of the vehicle 101 in order to determine whether to generate and follow an alternative trajectory to a different landing location.

Though the decision prompt 402 relates to updating a route of a vehicle 101, other decision prompts may be presented to an operator of the vehicle. For example, after the first segment of a trajectory ends in a DVE, a secondary prompt to switch from an autonomous mode of operation to a manual mode of operation may be presented, or a prompt to switch off or ignore certain sensor data may be presented. In this manner, multiple decision prompts may be provided to an operator to allow a robust system of handling a detected DVE.

Figure 5:
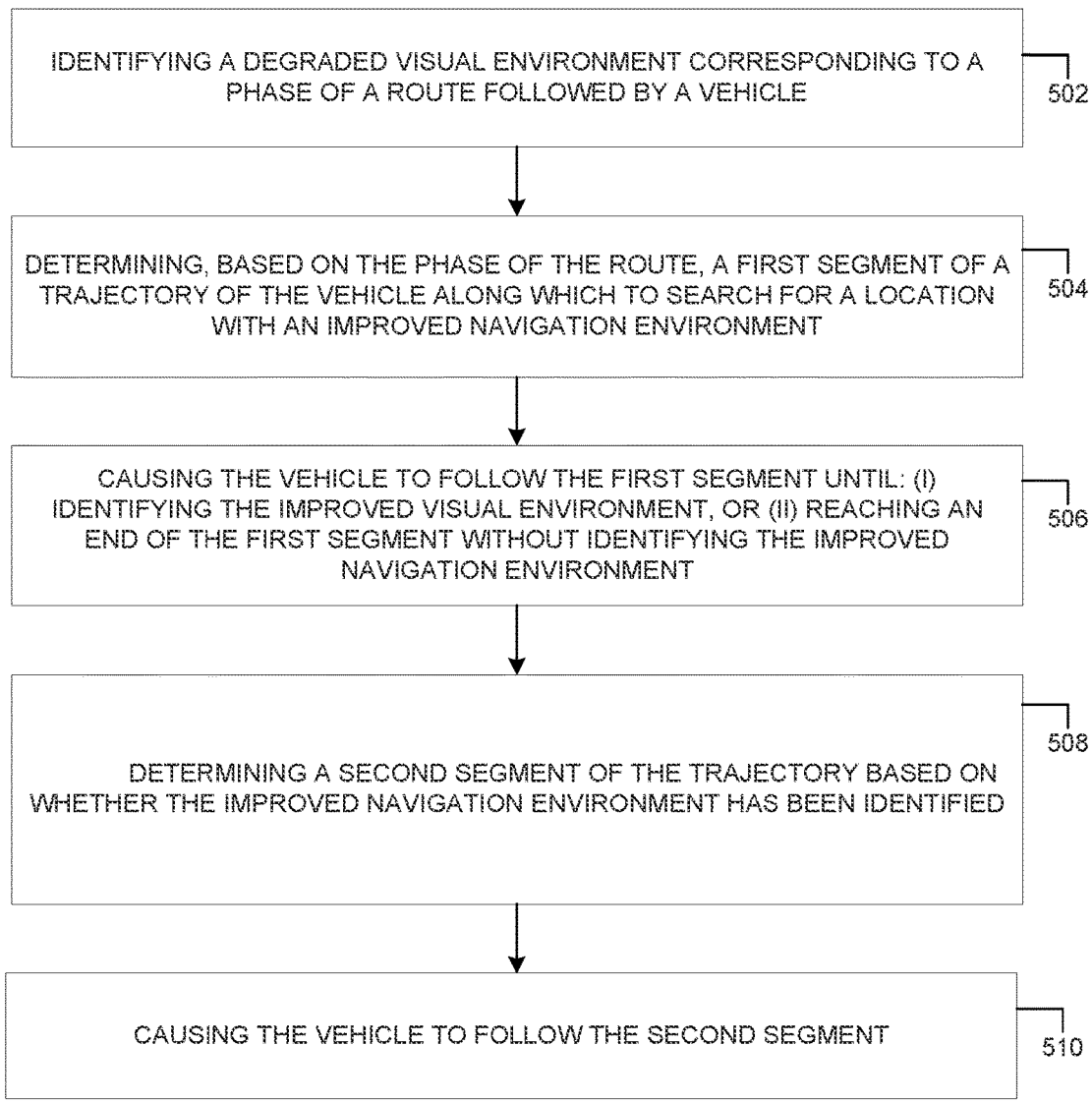
FIG. 5 illustrates a flowchart of a method of controlling a vehicle in a degraded visual environment, according to an example implementation.

FIG. 5 illustrates a flowchart of a method 500 of controlling a vehicle in a degraded visual environment, according to an example implementation. Method 500 shown in FIG. 5 presents an example of a method that could be used with the vehicle 101 shown in FIG. 1A, or with components of vehicle 101, such as the computing device 102 described with respect to FIG. 1A. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes identifying a degraded visual environment 212 corresponding to a phase of a route followed by the vehicle 101. For example, identifying the degraded visual environment 212 may be performed by the DVE detection system 120, as described above with respect to FIG. 1A.

At block 504, the method 500 includes determining, based on the phase of the route, a first segment 218 of a trajectory of the vehicle 101 along which to search for a location with an improved navigation environment 211. For example, in a takeoff phase 200, the first segment 218 may include an upwards trajectory, and in a landing phase 300, the first segment may include a trajectory towards a selected landing location.

At block 506, the method 500 includes causing the vehicle 101 to follow the first segment 218 until: (i) identifying the improved navigation environment 211, or (ii) reaching an end of the first segment 218 without identifying the improved navigation environment 211. In the takeoff phase 200, this involves searching for the improved navigation environment 211 until reaching a predetermined altitude (e.g., a maximum hovering altitude of the vehicle 101). In the landing phase 300, this may involve searching for confirmation that an alternative landing location (e.g., the alternative landing location 318) corresponds to an improved navigation environment (e.g., the improved navigation environment 311).

Within examples, detecting an improved navigation environment includes comparing sensor data to one or benchmarks for the sensor data, such as comparing first sensor data from a first sensor (e.g., a LIDAR) to second sensor data from a second sensor (e.g., a radar), and confirming that the first sensor data and the second sensor data represent the environment in a similar manner (e.g., within a threshold level of variation, such as with a correlation of 0.8 or greater). In further examples, detecting the improved navigation environment involves determining a change in data processing outputs using the sensor data. For example, this may involve confirming that a surface (e.g., ground surface 202) or object is identifiable using sensor data, perhaps after previously failing to identify the surface or object. In other examples, determining a change in data processing outputs includes determining a change in a number of detected obstacles using the sensor data. For example, if the DVE is determined based on an excess number of obstacles are detected in the environment (e.g., a detected number of obstacles exceeding a threshold number), then a reduction in the number of detected obstacles (e.g., a reduced number that is less than the threshold number) indicates an improved navigation environment. Within examples, determining the improves visual environment can be based on a type of DVE or a metric used for identifying the DVE. Other metrics of increased visibility relative to the DVE are possible.

At block 508, the method 500 includes determining a second segment (e.g., the alternative second segment 226) of the trajectory based on whether the improved navigation environment 211 has been identified. For example, in the takeoff phase 200, this may involve determining whether the improved navigation environment 211 has been identified before reaching the predetermined altitude. In the landing phase 300, this may involve determining whether to follow a planned trajectory (e.g., the planned route of block 140) or considering a decision prompt in order to determine the second segment (e.g., the second segment 327).

At block 510, the method 500 includes causing the vehicle to follow the second segment. Determining the first segment and the second segment in this manner allows the vehicle 101 to adaptively and reliably navigate within the degraded visual environment 212.

Within examples, identifying the degraded visual environment includes receiving sensor data obtained by one or more sensors (e.g., one or more sensors of the DVE detection system 120) on the vehicle 101, determining a difference between the sensor data and expected data, and identifying the degraded visual environment based on determining the difference between the sensor data and the expected data. For example, the expected data may include a data signature for each type of sensor that indicates a clear visual environment.

Within examples, identifying the degraded visual environment includes receiving sensor data obtained by one or more sensors (e.g., one or more sensors of the DVE detection system 120) on the vehicle 101, determining a data processing output (e.g., detecting one or more obstacles using the sensor data), comparing the data processing output to an expected data processing output (e.g., a threshold number of detected obstacles, such as a 10 detected obstacles), and identifying the degraded visual environment based on comparing the data processing output to the expected data processing output. For example, if the vehicle 101 appears to be surrounded by a number of obstacles that exceeds the threshold number based on the sensor data, then a degraded visual environment can be identified. These steps may reveal a degraded visual environment because some types of DVEs can cause visual sensors to provide data that appears to show many obstacles in the environment that are not actually present in the environment. Rather than allowing falsely detected obstacles to impact navigation of the vehicle 101, the vehicle can identify the DVE based on a data processing output, and react accordingly, such as by searching for an improved navigation environment within predetermined constraints.

Within examples, the one or more sensors includes a Light Detection and Ranging (LIDAR) device, and determining the difference between the sensor data and the expected data includes determining a difference between a number of returning light pulses represented by the sensor data and an expected number of returning light pulses. For example, a threshold percentage (e.g., 75%) of returning light pulses may be used for the comparison, and a threshold deviation (e.g., more than ±10%) of returning light pulses may indicate the degraded visual environment 212.

Within examples, the one or more sensors includes a camera (e.g., an RGB camera), and determining the difference between the sensor data and the expected data includes determining a lack of variation in pixel intensities relative to the expected data. For example, a histogram of the pixel intensities may not follow an expected distribution, and instead have mostly similar pixel intensities that indicate scattered or ambient lighting associated with the degraded visual environment 212.

Within examples, identifying the degraded visual environment 212 includes receiving sensor data obtained by one or more sensors on the vehicle 101, searching for an identifiable surface (e.g., the ground surface 202) from the sensor data, and identifying the degraded visual environment based on the search. For example, this may involve failing to identify the ground surface 202 from a predetermined distance (e.g., 200 feet) may be associated with the degraded visual environment.

Within examples receiving sensor data obtained by one or more sensors on the vehicle 101, and identifying the degraded visual environment 212 based on determining that the sensor data matches a data signature corresponding to a type of degraded visual environment. For example, a histogram of pixel intensities of a camera may match a histogram a given source of a DVE (e.g., dust, fog, etc.), or a distribution of detected distances from a LIDAR device may match a distribution of distances of a given source of a DVE. Within examples, the data signature comprises a noise signature associated with the one or more sensors. For example, data associated with a DVE may manifest as Gaussian noise, salt-and-pepper noise, shot noise, or another type of noise signature.

Within examples, identifying the degraded visual environment 212 includes receiving an indication of an area 322 having the degraded visual environment 310, and determining that a waypoint (e.g., the second waypoint 306) associated with the first segment of the trajectory falls within the area 322. For example, the indication of the area 322 may be a weather report or visibility report received from another vehicle or another computing device, such as an air traffic controller.

Within examples, identifying the degraded visual environment 212 environment includes receiving sensor data obtained by one or more sensors on the vehicle, 101 wherein the sensor data comprises first sensor data from a first sensor (e.g., an RGB camera) and second sensor data from a second sensor (e.g., a radar), and identifying the degraded visual environment based on a comparison between the first sensor data and the second sensor data. For example, the second sensor data may indicate an object or surface that is not indicated by the first sensor data, or the second sensor data may render into a representation of the environment that does not match a representation of the environment rendered from the first sensor data.

Within examples, the first sensor data may be associated with a first category of sensors. For example the first category of sensors may be a visual sensor that converts light rays into electronic signals and outputs a 2D pixel array representation of a measured 3D space. In this context, the term "visual" relates to light being readable/detectable by the sensor, and the term "light" includes the visible spectrum as well as the infrared spectrum. Further, the second sensor data may be associated with a second category of sensors. The second category of sensors may be a non-visual sensor that does not resolve detected light into a 2D pixel array representation of a measured 3D space. This may include sound wave detectors, magnetic sensors, pressure sensors, temperature sensors, or other sensors that do not correspond to the first category of sensors. In other examples, the first sensor data and the second sensor data may correspond to two different sensors, which provides redundancy in detecting a DVE, detecting an improved navigation environment after detecting the DVE, verifying DVE detections between the first and second sensors data, identifying failure of one of the first and second sensors based on a comparison between the first and second sensor data, or enhancing the accuracy of DVE detection using two different characteristics of the sensor data from the first and second sensors. Some examples of combinations of sensors include an electro-optical (EO) sensor and a short wave infrared (SWIR) sensor, a synthetic aperture radar (SAR) sensor and a LIDAR sensor, a SAR sensor and an EO sensor, a SAR sensor and a SWIR sensor, two EO sensors, two LIDAR sensors. Some sensors may have differing ability to view an environment when the vehicle 101 is in a DVE. For example, a long wave infrared (LWIR) sensor may have better ability to see through the DVE than a LIDAR sensor, while the LIDAR sensor has a higher resolution that the LWIR sensor, and these can be paired together when determining the second segment of the trajectory. Similarly, a LWIR sensor can be paired with an EO sensor, or with an SWIR sensor. Still further, different sensors having relatively high ability to view the environment during the DVE but having relatively low resolutions can be paired together. For example, a SAR sensor can be paired with a LWIR sensor. Other combinations of sensors that provide the first sensor data and the second sensor data are possible.

Within examples, the vehicle 101 includes an aircraft and the phase of the route is a takeoff phase 200. Within these examples, determining the first segment 218 of the trajectory includes determining an upward trajectory that starts at a takeoff location and ends at a predetermined waypoint. Within these examples, determining the second segment 224 of the trajectory based on whether the improved navigation environment has been identified includes determining that the improved navigation environment has not been identified while following the first segment 218 of the trajectory, and responsive to determining that the improved navigation environment has not been identified while following the first segment 218 of the trajectory, determining a downward trajectory that starts at the predetermined waypoint and ends at the takeoff location. For example, this may correspond to the examples illustrated in FIGS. 2C and 2D.

Within examples, the vehicle 101 includes an aircraft and the phase of the route is a landing phase 300. In these examples, determining the first segment of the trajectory includes determining a downward trajectory that starts at a current position of the aircraft and ends at a landing waypoint disposed above a ground surface 202.

Within examples, the vehicle 101 includes an aircraft navigating towards a landing location 308, and the phase of the route is a landing phase 300. In these examples, the method 500 further includes determining a landing rating for the landing location 308 based on previous landings of one or more aircrafts at the landing location. For example the aircraft may include or have access to a database of landing locations and landing ratings corresponding to the landing locations, and determining the landing ratings may include retrieving a landing rating for the landing location 308. Determining the first segment of the trajectory can include setting an alternative landing location (e.g., the alternative landing location 318) based on (i) the landing rating being less than a threshold landing rating (e.g., less than 80 out of 100), and (ii) the degraded visual environment 310. In these examples, determining the first segment 326 of a trajectory includes determining a trajectory that starts at a current position of the aircraft and ends at a second waypoint 316 associated with the alternative landing location 318.

Within examples, the method 500 further includes, responsive to determining the degraded visual environment, providing a prompt (e.g., the decision prompt 402) by way of a user interface 400 of the vehicle 101. In these examples, the prompt relates to (i) the degraded visual environment 310, and (ii) an option to set the first segment 326 of the trajectory and the second segment 327 of the trajectory.

Within examples, the method 500 further includes, responsive to determining the degraded visual environment 310, switching from an autonomous mode of operation of the vehicle 101 to a manual mode of operation of the vehicle 101.

The described systems and methods described herein provide functionality that enables autonomous takeoff and landing of a vehicle in a degraded visual environment. Determining segments of a trajectory of the vehicle depending on context and the degraded visual environment allows for a robust, consistent, and adaptive manner of handling different types of visual states, and provides both autonomous and manual operators ways of dynamically selecting and updating routes of the vehicle.

Though the contexts of operating vehicles provided herein generally depict or describe an aircraft, such as a helicopter, it should be understood that similar contexts may arise for other types of vehicles. For example, a land vehicle may also encounter a DVE, and may handle its route differently depending on a current phase (e.g., a starting phase or an ending phase) of the route. Accordingly, the above-described embodiments are not limited to those involving an aircraft, but can more generally be applied to vehicles.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for controlling a vehicle in a degraded visual environment, comprising:
    identifying a degraded visual environment along a planned route of the vehicle;
    changing, in response to identifying the degraded visual environment, the planned route to include a first segment along which to search for a location with an improved navigation environment;
    causing the vehicle to follow the first segment until:
        (i) identifying the improved navigation environment, or
        (ii) reaching an end of the first segment without identifying the improved navigation environment;
    changing the planned route to include a second segment that is determined based on whether the improved navigation environment has been identified; and
    causing the vehicle to follow the second segment.

2. The method of claim 1, further comprising:
    receiving sensor data obtained by one or more sensors on the vehicle; and
    determining a difference between the sensor data and expected data,
    wherein identifying the degraded visual environment comprises identifying the degraded visual environment based on determining the difference between the sensor data and the expected data.

3. The method of claim 2, wherein the one or more sensors comprise a Light Detection and Ranging (LIDAR) device, and wherein determining the difference between the sensor data and the expected data comprises determining a difference between a number of returning light pulses represented by the sensor data and an expected number of returning light pulses.

4. The method of claim 2, wherein the one or more sensors comprise a camera, and wherein determining the difference between the sensor data and the expected data comprises identifying a lack of variation in pixel intensities relative to the expected data.

5. The method of claim 1, further comprising:
    receiving sensor data obtained by one or more sensors on the vehicle; and
    searching for an identifiable surface from the sensor data,
    wherein identifying the degraded visual environment comprises identifying the degraded visual environment based on the search.

6. The method of claim 1, further comprising:
    receiving sensor data obtained by one or more sensors on the vehicle, wherein identifying the degraded visual environment comprises:
    identifying the degraded visual environment based on determining that the sensor data matches a data signature corresponding to a type of degraded visual environment.

7. The method of claim 6, wherein the data signature comprises a noise signature associated with the one or more sensors.

8. The method of claim 1, wherein identifying the degraded visual environment comprises:
    receiving an indication of an area having the degraded visual environment; and
    determining that a waypoint associated with the first segment falls within the area.

9. The method of claim 1, further comprising:
    receiving sensor data obtained by one or more sensors on the vehicle, wherein the sensor data comprises first sensor data from a first sensor and second sensor data from a second sensor,
    wherein identifying the degraded visual environment comprises identifying the degraded visual environment based on a comparison between the first sensor data and the second sensor data.

10. The method of claim 1, wherein the vehicle comprises an aircraft, wherein the planned route comprises a takeoff route, and wherein the first segment comprises an upward trajectory that starts at a takeoff location and ends at a predetermined waypoint.

11. The method of claim 10, wherein changing the planned route to include the second segment comprises:
    determining that the improved navigation environment has not been identified while following the first segment; and
    responsive to determining that the improved navigation environment has not been identified while following the first segment, determining a downward trajectory that starts at the predetermined waypoint and ends at the takeoff location.

12. The method of claim 1, wherein the vehicle comprises an aircraft, wherein the planned route comprises a landing phase, and wherein the first segment comprises a downward trajectory that starts at a current position of the aircraft and ends at a landing waypoint disposed above a ground surface.

13. The method of claim 1, wherein the vehicle comprises an aircraft navigating towards a landing location, and wherein the planned route comprises a landing phase, the method further comprising:

determining a landing rating for the landing location based on previous landings of one or more aircrafts at the landing location; and setting an alternative landing location based on (i) the landing rating being less than a threshold landing rating, and (ii) the degraded visual environment, wherein the first segment comprises a trajectory that starts at a current position of the aircraft and ends at a landing waypoint associated with the alternative landing location.

14. The method of claim 1, further comprising:

responsive to identifying the degraded visual environment, providing a prompt by way of a user interface of the vehicle, wherein the prompt relates to (i) the degraded visual environment, and (ii) an option to set the first segment and the second segment.

15. The method of claim 1, further comprising:

responsive to identifying the degraded visual environment, switching from an autonomous mode of operation of the vehicle to a manual mode of operation of the vehicle.

16. A system for controlling a vehicle in a degraded visual environment, comprising:

a vehicle comprising:
  a computing device having a processor and memory storing instructions executable by the processor to cause performance of functions comprising:
  identifying a degraded visual environment along a planned route of the vehicle;
  changing, in response to identifying the degraded visual environment, the planned route to include a first segment along which to search for a location with an improved navigation environment;
  causing the vehicle to follow the first segment until:
    (i) identifying the improved navigation environment, or
    (ii) reaching an end of the first segment without identifying the improved navigation environment;
  changing the planned route to include a second segment that is determined based on whether the improved navigation environment has been identified; and
  causing the vehicle to follow the second segment.

17. The system of claim 16, further comprising a light detection and ranging (LIDAR) device on the vehicle, the functions further comprising:

receiving sensor data obtained by the LIDAR device; and
determining a difference between a number of returning light pulses represented by the sensor data and an expected number of returning light pulses, wherein identifying the degraded visual environment comprises identifying the degraded visual environment based on determining the difference between the number of returning light pulses represented by the sensor data and the expected number of returning light pulses.

18. The system of claim 16, wherein the vehicle comprises an aircraft navigating towards a landing location, and wherein the planned route comprises a landing phase, the system further comprising a database of landing locations and landing ratings corresponding to the landing locations, the functions further comprising:

retrieving a landing rating for the landing location,
wherein changing the planned route to include the first segment comprises changing the planned route based on (i) the landing rating for the landing location, and (ii) the degraded visual environment.

19. The system of claim 16, further comprising a user interface associated with the computing device, the functions further comprising:

providing a prompt by way of the user interface, wherein the prompt relates to (i) the degraded visual environment, and (ii) an option to set the first segment; and
receiving an input corresponding to the prompt by way of the user interface,
wherein changing the planned route to include the first segment comprises changing the planned route based on the input.

20. A non-transitory computer readable medium having stored thereon instructions, that when executed by one or more processors of a computing device, cause the computing device to perform functions comprising:

identifying a degraded visual environment along a planned route of a vehicle;
changing, in response to identifying the degraded visual environment, the planned route to include a first segment along which to search for a location with an improved navigation environment;
causing the vehicle to follow the first segment until:
  (i) identifying the improved navigation environment, or
  (ii) reaching an end of the first segment without identifying the improved navigation environment;
changing the planned route to include a second segment that is determined based on whether the improved navigation environment has been identified; and
causing the vehicle to follow the second segment.

* * * * *